United States Patent
Maruyama et al.

(10) Patent No.: US 8,348,799 B2
(45) Date of Patent: Jan. 8, 2013

(54) DIFFERENTIAL DEVICE

(75) Inventors: Atsushi Maruyama, Utsunomiya (JP);
Hiroyasu Furukawa, Utsunomiya (JP);
Masaaki Fusegi, Shimotsuga-gun (JP)

(73) Assignee: GKN Driveline Torque Technology KK, Tochigi-shi, Tochigi-ken (JP)

( * ) Notice: Subject to any disclaimer, the term of this patent is extended or adjusted under 35 U.S.C. 154(b) by 629 days.

(21) Appl. No.: 12/548,961

(22) Filed: Aug. 27, 2009

(65) Prior Publication Data
US 2010/0056314 A1 Mar. 4, 2010

(30) Foreign Application Priority Data

Aug. 27, 2008 (JP) .............................. P2008-217648
Dec. 11, 2008 (JP) .............................. P2008-315707

(51) Int. Cl.
*F16H 48/30* (2012.01)
*F16H 48/20* (2012.01)
*F16D 19/00* (2006.01)
*F16D 27/00* (2006.01)
*F16D 37/02* (2006.01)

(52) U.S. Cl. ................ 475/150; 475/231; 192/84.1
(58) Field of Classification Search .............. 475/150, 475/230, 231; 192/84.1–84.5, 84.93
See application file for complete search history.

(56) References Cited

U.S. PATENT DOCUMENTS

| 5,156,578 | A  | * | 10/1992 | Hirota | 475/150 |
|---|---|---|---|---|---|
| 5,326,333 | A  | * | 7/1994 | Niizawa et al. | 475/249 |
| 6,436,002 | B1 |   | 8/2002 | Ishikawa et al. | |
| 6,582,336 | B2 | * | 6/2003 | Forrest et al. | 475/150 |
| 6,719,662 | B2 | * | 4/2004 | Forrest et al. | 475/231 |
| 7,354,374 | B2 | * | 4/2008 | Teraoka | 475/231 |
| 2006/0289265 | A1 | * | 12/2006 | Hirota | 192/84.91 |
| 2011/0105264 | A1 | * | 5/2011 | Maruyama et al. | 475/150 |

FOREIGN PATENT DOCUMENTS

JP 2007-315583 12/2007

* cited by examiner

*Primary Examiner* — Tisha Lewis
(74) *Attorney, Agent, or Firm* — Morrison & Foerster LLP

(57) ABSTRACT

A differential device differentially distributes a driving force to first and second axles. The differential device is comprised of a differential gear set configured to allow differential motion between the first and second axles, a casing rotatable about an axis, the casing housing and being drivingly coupled with the differential gear set and including a first end wall, a second end wall axially opposed to the first end wall, and a side wall disposed radially outward, which in combination with the first end wall and the second end wall defines a chamber configured to house the differential gear set, a clutch engageable with the differential gear set, a solenoid configured to drive the clutch, which is disposed adjacent to the first end wall, and a magnetic core fixed to the solenoid. The magnetic core is comprised of a sleeve portion snugly and slidably fitting around an outer periphery of the side wall to radially position the core and the solenoid in place.

13 Claims, 5 Drawing Sheets

DIFFERENTIAL DEVICE

CROSS-REFERENCE TO RELATED APPLICATIONS

This application is based upon and claims the benefit of priority from the prior Japanese Patent Applications No. 2008-217648 (filed Aug. 27, 2008) and No. 2008-315707 (filed Dec. 11, 2008); the entire contents of which are incorporated herein by reference.

BACKGROUND OF THE INVENTION

1. Field of the Invention

The present invention relates to a differential device applied to conveyance means such as automobiles.

2. Description of the Related Art

As is known, an automobile is equipped with a differential, which distributes a driving force of an engine to right and left output axles with allowing differential motion between the axles. Some differentials have proper means for limiting or locking the differential motion between the right and left axles under control so as not to lose traction with the road particularly when one of the wheels loses contact with the road.

In certain cases, a solenoid is used to actuate a device for locking differential motion. How to combine the stationary solenoid with the rotating differential and how to properly position the solenoid relative to the differential are technical issues.

A factor of the issues is that, whereas the differential rotates, the solenoid must be stationary. The reason is that otherwise an electric connection with an electric power source installed on a stationary member cannot be established and the solenoid cannot bear reaction force in response to actuation.

Another factor is that a casing of the differential in general requires an appropriate gap relative to the core to reduce magnetic loss and the gap needs to be stable. The casing is generally made of steel which strongly induces magnetic flux from a magnetic core of the solenoid. When the gap fluctuates, energy loss will occur.

Japanese Patent Application Laid-open No. 2007-315583 discloses an art for supporting a solenoid relative to a differential.

SUMMARY OF THE INVENTION

An object of the present invention is to provide a differential device having a simple but reliable structure in light of support of a solenoid.

According to a first aspect of the present invention, a differential device for differentially distributing a driving force to first and second axles is comprised of: a differential gear set configured to allow differential motion between the first and second axles; a casing rotatable about an axis, the casing housing and being drivingly coupled with the differential gear set and including a first end wall, a second end wall axially opposed to the first end wall, and a side wall disposed radially outward, the side wall in combination with the first end wall and the second end wall defining a chamber configured to house the differential gear set; a clutch engageable with the differential gear set; a solenoid configured to drive the clutch, the solenoid being disposed adjacent to the first end wall; and a magnetic core fixed to the solenoid, the core including a sleeve portion snugly and slidably fitting around an outer periphery of the side wall to radially position the core and the solenoid in place.

According to a second aspect of the present invention, a differential device for differentially distributing a driving force of a power source to first and second axles, the differential device is comprised of: a casing driven by the power source to rotate about an axis, the casing including a first end wall, a second end wall axially opposed to the first end wall, and a side wall disposed radially outward, the side wall in combination with the first end wall and the second end wall defining a housing chamber; a differential gear set configured to allow differential motion between the first and second axles, the differential gear set being housed in the housing chamber and drivingly coupled with the casing; a clutch configured to lock the differential motion; and an actuator including a solenoid to generate a magnetic flux, a plunger axially driven by the magnetic flux to drive the clutch, and a magnetic core configured to conduct the magnetic flux, the magnetic core including a sleeve portion snugly and slidably fitting around an outer periphery of the side wall to radially position the core and the solenoid in place, the core in combination with the first end wall and the plunger forming a closed magnetic circuit.

DETAILED DESCRIPTION OF THE PREFERRED EMBODIMENT

Certain embodiments of the present invention will be described hereinafter with reference to the appended drawings. Throughout the specification, claims and the drawings, an axial direction means a direction along an axis of a differential device unless any other particular descriptions are given. The axial direction is generally correspondent to lateral directions of FIGS. 1 and 3-5.

Whereas the following description exemplifies usage of solenoids as actuators for actuating clutches to lock differential motion, these devices may be instead used in combination with 4WD-2WD switchable differentials.

First Embodiment

Figure 1:
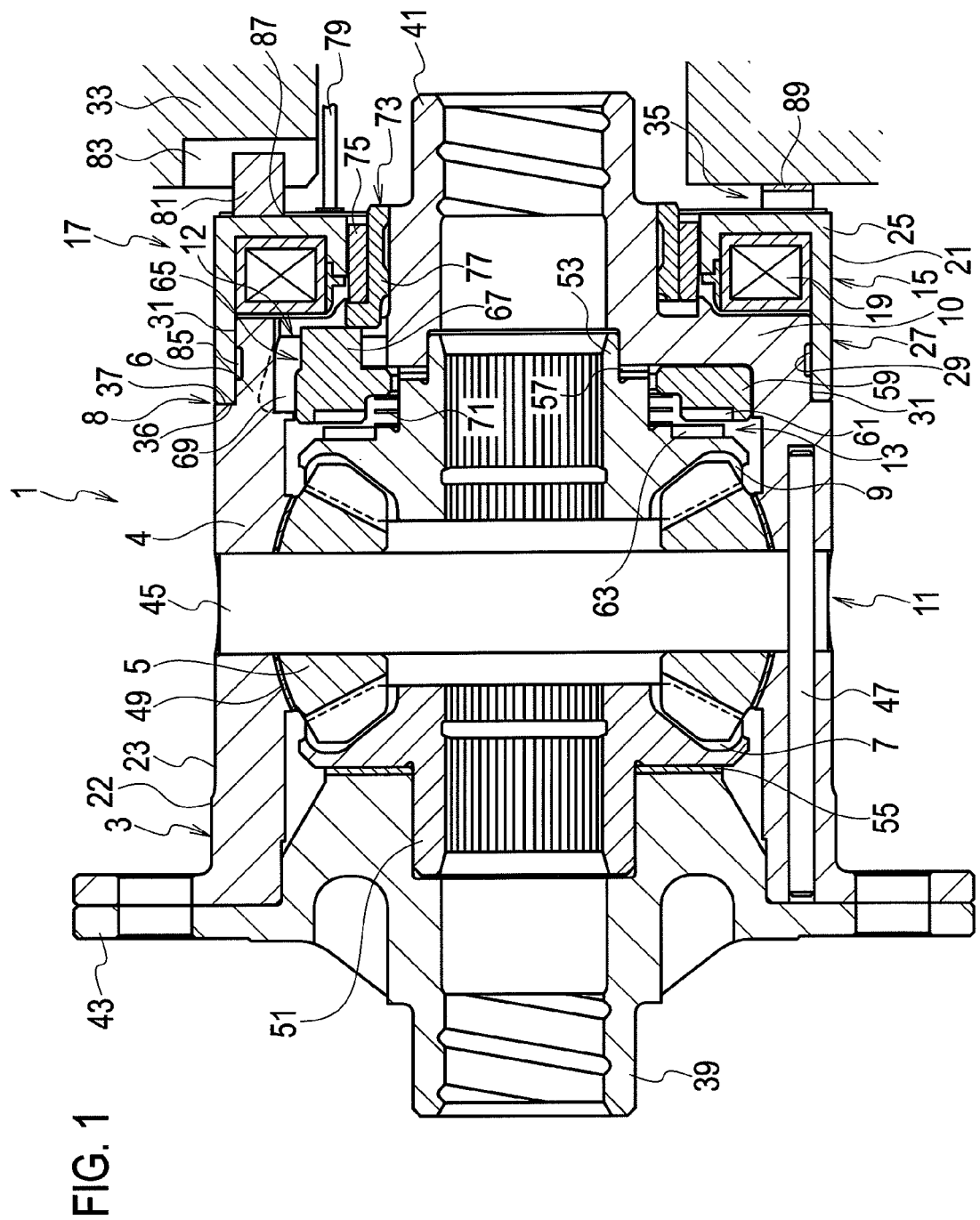
FIG. 1 is a sectional view of a differential device according to a first embodiment of the present invention.
Figure 2:
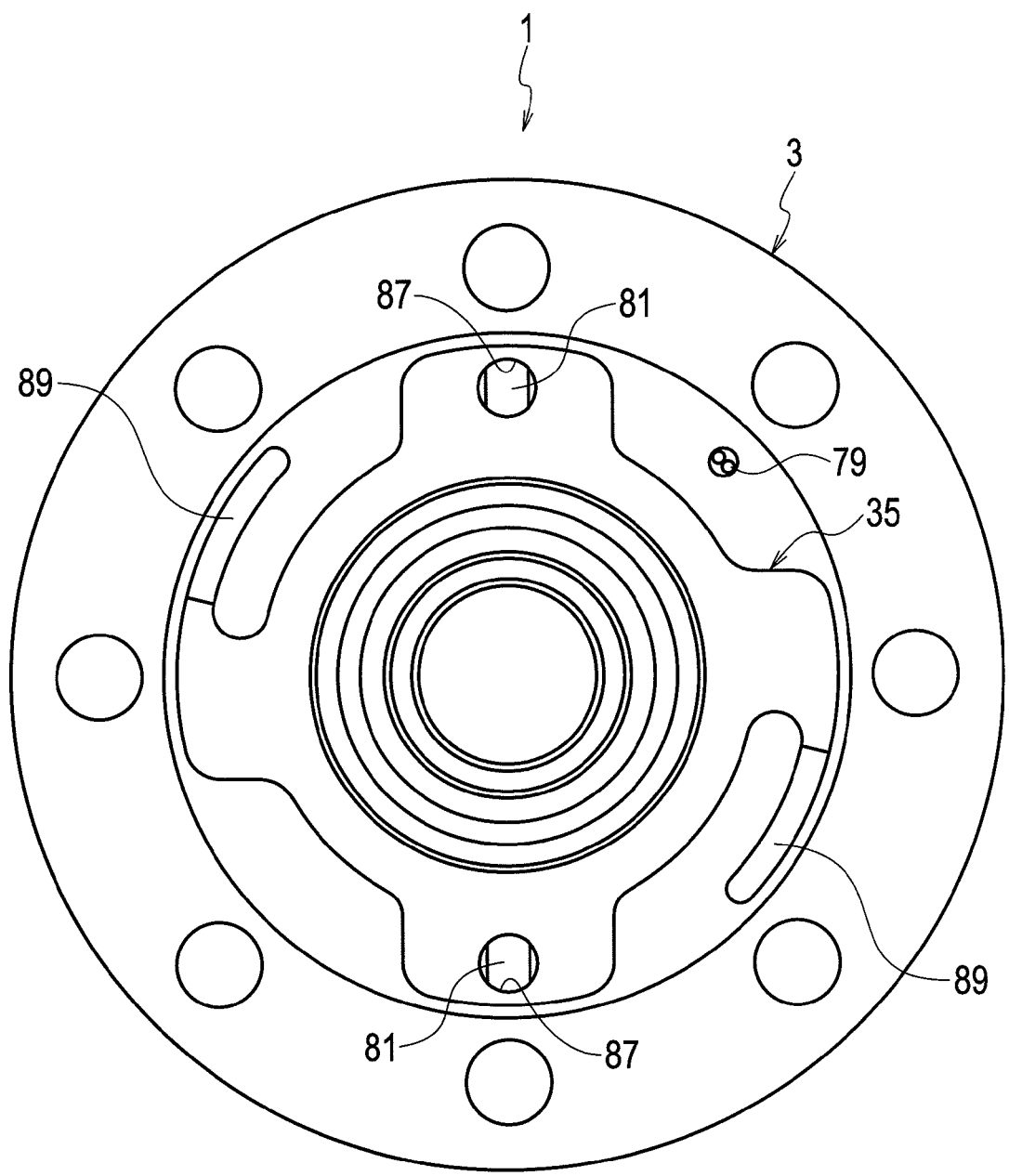
FIG. 2 is a side view of the differential device viewed from the right of FIG. 1.

FIGS. 1 and 2 illustrate a differential device 1 for differentially distributing a driving force generated by an engine to right and left axles in accordance with a first embodiment of the present invention. The differential device 1 is comprised of a differential case 3 which receives the driving force to rotate about an axis, a differential gear set 11 housed in the case 3, a clutch 13 for engaging with the differential gear set 11 to lock differential motion thereof, and an actuator 17 for actuating the clutch 13.

The differential case 3 is drivingly coupled with the differential gear set 11 and therefore the differential gear set 11 along with the differential case 3 rotates about the axis of the case 3. The differential case 3 is in general made up of a right end wall 10, a left end wall opposed to the right end wall 10, and a side wall 4 generally formed in a cylindrical shape, so as to define a chamber therein for housing the differential gear set 11. Right and left boss portions 41,39 respectively project out of the right and left end walls in the axial direction.

The outer periphery 22 of the side wall 4 may have a stepped portion 8 along a right end 6 thereof, which stepwise shrinks in diameter as compared with the other portion of the outer periphery 22. The stepped portion 8 is to receive a sleeve portion 27 of a magnetic core 25 described below. The stepped portion 8 may be made up of a slidable surface 31 for slidingly fitting with the sleeve portion 27 and a step wall 37 for abutting on the end of the sleeve portion 27. The slidable surface 31 may be comprised of a lubricant groove 85 to retain lubricant oil therein, which keeps oil film between the stepped portion 8 and the sleep portion 27, thereby reducing friction resistance. Alternatively, or additionally, any other lubricant means may be applied to this portion.

The actuator 17 is comprised of a solenoid 15 for electromagnetically driving the clutch 13 and a magnetic core 25 for conducting magnetic flux. The solenoid 15 is disposed adjacent to the right end wall 10 of the case 3 and is comprised of a coiled wire 19 for generating the magnetic flux. The coiled wire 19 is preferably molded in resin. The magnetic core 25 made of a magnetic material is fixed to and skirts the wire 19 from its inner periphery via the right side through the outer periphery thereof. The end of the magnetic core 25 is elongated leftward to form the sleeve portion 27 described above. The sleeve portion 27 snugly and slidably fits around the outer periphery 22 of the side wall 4, or preferably fits around the stepped portion 8, thereby positioning the solenoid 15 in place in the radial direction.

Anti-rotation members 81 are provided to latch on slots 83 of a stationary member 33, thereby anti-rotating the solenoid 15.

Further, to stabilize the solenoid 15 in the axial direction, an elastic body 35 is interposed between the core 25 and the stationary member 33. Referring to FIG. 2, the elastic body 35 is formed in a ring-like shape and has openings 87 and elastic leafs 89. The openings 87 are opened symmetrically about the axis. The anti-rotation members 81 respectively pass through the openings 87 and thereby the elastic body 35 is positioned in place and also anti-rotated. The elastic leafs 89 are formed symmetrically about the axis and slightly bent up toward the stationary member 33. As the elastic leafs 89 abut on the stationary member 33 with repulsive force, the elastic body 35 forces the core 25 toward the right end wall 10. Then the furthermost end 36 of the sleeve portion 27 may abut on the step wall 37.

The outer periphery 22 of the side wall 4 may be treated with any proper hardening treatment, such as carburizing, carbonitriding, nitriding, induction hardening, or any hard coating for example. The portion subject to the hardening treatment may be limited to the slidable surface 31 and the step wall 37. Alternatively, or additionally, the sleeve portion 27 may be treated with the hardening treatment. The portion subject to hardening may be limited to the inner periphery 29 and the furthermost end 36.

The boss portions 39,41 are rotatably supported by bearings provided on the stationary member 33, thereby the differential case 3 is rotatably supported.

The differential case 3 may be further comprised of a flange portion 43 for link with a ring gear (not shown) which receives the driving force of the engine. The outer periphery 22 of the case 3 fits with the inner periphery of the ring gear to place the ring gear in a coaxial disposition with the axis of the case 3.

The differential gear set 11 is of a bevel gear type generally made up of pinions 5, pinion shafts 45, and a pair of side gears 7 and 9. Instead of the bevel gear type, other types such as a helical gear type or the other may be applied to the differential gear set 11.

The pinion shafts 45 are secured to the differential case 3 by means of pins 47 and rotatably support the pinions 5, thereby allowing rotation of the pinions 5 about the shafts 45 and also driving the pinions 5 to rotate about the axis of the case 3. Spherical washers 49 may be interposed between the pinions 5 and the case 3 so as to facilitate rotation.

The side gears 7,9 are respectively comprised of boss portions 51,53 which are rotatably supported by the differential case 3. The side gears 7,9 respectively have gear teeth engaged with gear teeth of the pinions 5 and splined inner bores to drivingly engage with the axles, thereby transmitting the driving force from the pinions 5 to the axles with allowing differential motion therebetween. The right side gear 9 is furnished with clutch teeth 63 engageable with clutch teeth 61 of a movable member 59 to form the clutch 13. Thrust washers 55,57 may be interposed between the side gears 7,9 and the case 3 to facilitate rotation.

The movable member 59 is made movable in the axial direction and comprised of the clutch teeth 61 and projections 67. The right end wall 10 of the differential case 3 has openings 12, through which the projections 67 are exposed to the actuator 17. The projections 67 may have oblique side faces and correspondingly the differential case 3 may have oblique slots 69. Contact of the oblique slots 69 on the oblique side faces of the projections 67 makes the movable member 59 rotate along with the case 3. Further the combination of the oblique slots 69 and the oblique side faces of the projections 67 forms a cam mechanism 65 to partially convert torque of the case 3 into axial force which assists engagement of the clutch 13.

The actuator 17 is comprised of the solenoid 15, an electric cable 79 led out of the solenoid 15, and a plunger 73 axially driven by the solenoid 15. The plunger 73 is comprised of an armature 75 made of a magnetic material and a ring 77 engaging with the armature 75. The ring 77 is formed in a ring-like shape so as to slidably fit around the boss portion 41 of the case 3 and has projections for contact with the projections 67 of the movable member 59. The ring 77 is preferably made of any non-magnetic material so as to reduce leakage of magnetism to the case 3. A power source and a controller both installed on the automobile, but not shown in the drawings, are connected with the solenoid 15 via the electric cable 79.

The magnetic core 25 and a part of the right end wall 10 of the case 3 in combination form a magnetic circuit around the coiled wire 19 but leave a gap at the inner periphery of the solenoid 15. The armature 75 spans the gap, thereby closing the magnetic circuit.

When magnetic flux is generated under control by the controller, the magnetic core 25 and the part of the right end wall 10 conducts the generated magnetic flux. Then the magnetic flux crosses and thereby drives the armature 75 in the axial direction. The ring 77 driven along with the armature 75 actuates the movable member 59 via the projections 67, thereby engaging the clutch 13. When the actuator 17 engages the clutch 13, the cam mechanism assists engagement of the clutch 13 as described above. A return spring 71 is repulsively interposed between the movable member 59 and the right side gear 9 so as to urge the movable member 59 in a direction where the clutch 13 is disengaged.

The engaged clutch 13 puts the differential device 1 into a differential lock state in which both the axles rotate in the same speed. When excitation of the solenoid 15 is stopped, the return spring 71 disengages the clutch 13 so as to allow the differential device 1 to do differential motion.

The snug and slidable fit of the sleeve portion 27 on the outer periphery 22 (or the stepped portion 8) positions the core 25 and the solenoid 15 in place as being coaxial with the axis of the differential case 3. This allows omission of any other means for securing or supporting the solenoid 15 relative to the stationary member 33 in the radial direction. Further, this configuration is beneficial in light of easiness of installation because a step of securing the solenoid with the stationary member can be omitted. Installation of the solenoid 15 on the differential case 3 can be executed prior to installation of the differential device 1 into the automobile, and then the integrated body as a whole can be subject to installation into the driveline system of the automobile. This further facilitates the installation process.

The positional relation of the core 25 with the differential case 3 is inherently stable. Further, lack of securing means relative to the stationary member leads to reduction of vibration transmission from the automobile body to the core 25. Therefore fluctuation in magnetic flux can be reduced.

Usage of the stepped portion 8 for fitting the outer periphery 21 of the case 3 with the sleeve portion 27 is beneficial in light of reduction of the diameter of the magnetic core 25, although it is not indispensable for the present embodiment. In this view, the thickness of the sleeve portion 27 is preferably equal to, or smaller than, the depth of the stepped portion 8. Then the outer periphery 21 of the magnetic core 25 is level with, or recedes inward from, the outer periphery 22 of the case 3 except the stepped portion 8. This is beneficial in light of overall size reduction of the differential device 1.

Second Embodiment

Figure 3:
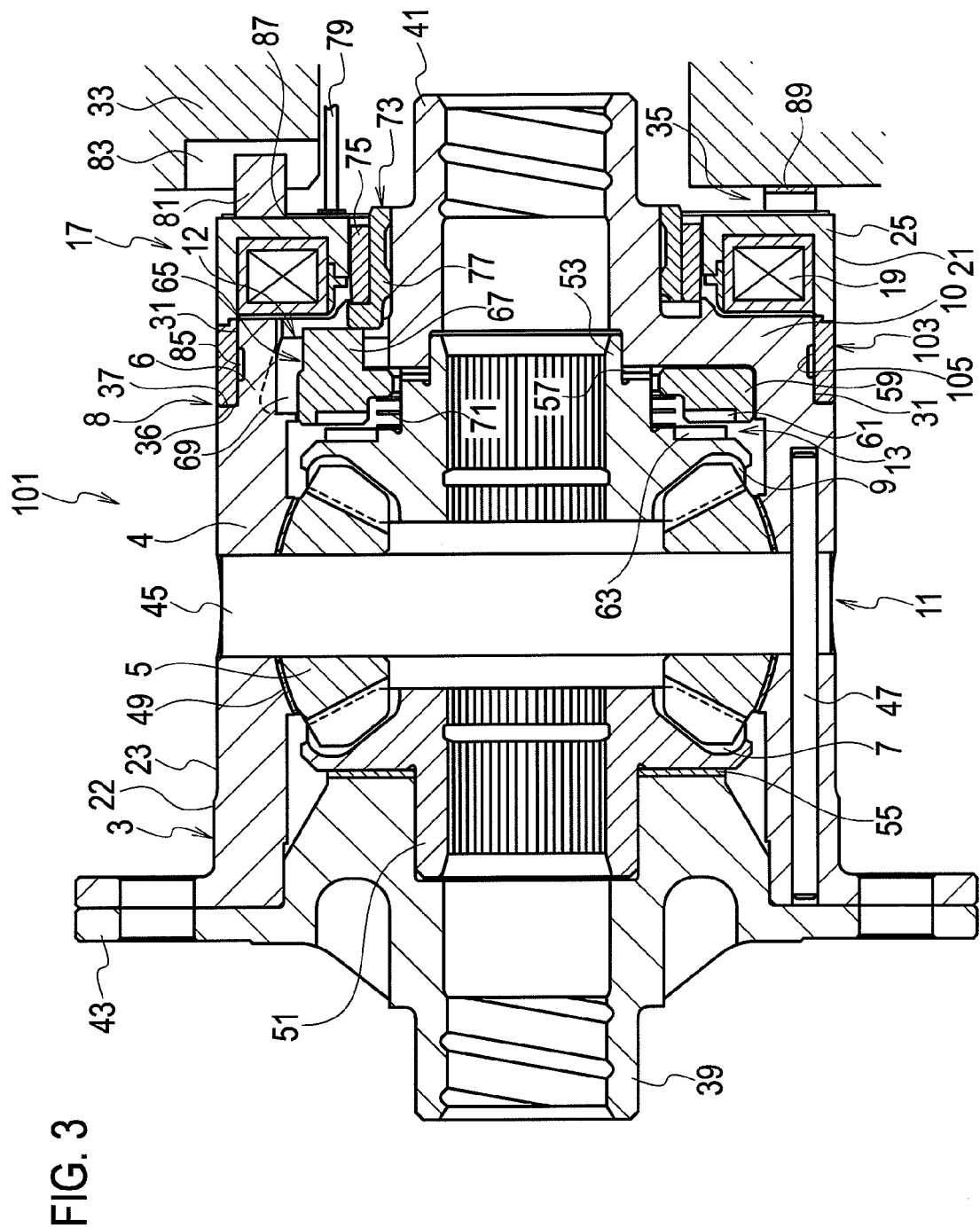
FIG. 3 is a sectional view of a differential device according to a second embodiment of the present invention.

Referring to FIG. 3, a second embodiment of the present invention will be described hereinafter.

A differential device 101 in accordance with the second embodiment has a structure similar to that of the aforementioned differential device 1 as the same reference numerals are attached to FIG. 3. The following description will be mainly given to differences from the aforementioned first embodiment.

The end of the magnetic core 25 on the outer periphery of the coiled wire 19 ends up around the left end of the coiled wire 19. Instead of the elongation like as the first embodiment, a sleeve portion 103 once formed in a separate body is fixed to, bonded with, fused with, or united with the end of the magnetic core 25.

Any hardening treatment may be executed on the inner periphery 105 as with the case of the first embodiment. Because the sleeve portion 103 is formed in a separate body, area limitation of such a treatment can be easily done. Therefore the present embodiment provides easiness of manufacturing. If the sleeve portion 103 is treated with the hardening treatment, the opposite slidable surface 31 of the case 3 need not be treated with a hardening treatment. Of course, the slidable surface 31 may be additionally treated with a hardening treatment.

Moreover, the present embodiment provides better maintainanceability because the sleeve portion 103 can be replaced when it is worn.

Third Embodiment

Figure 4:
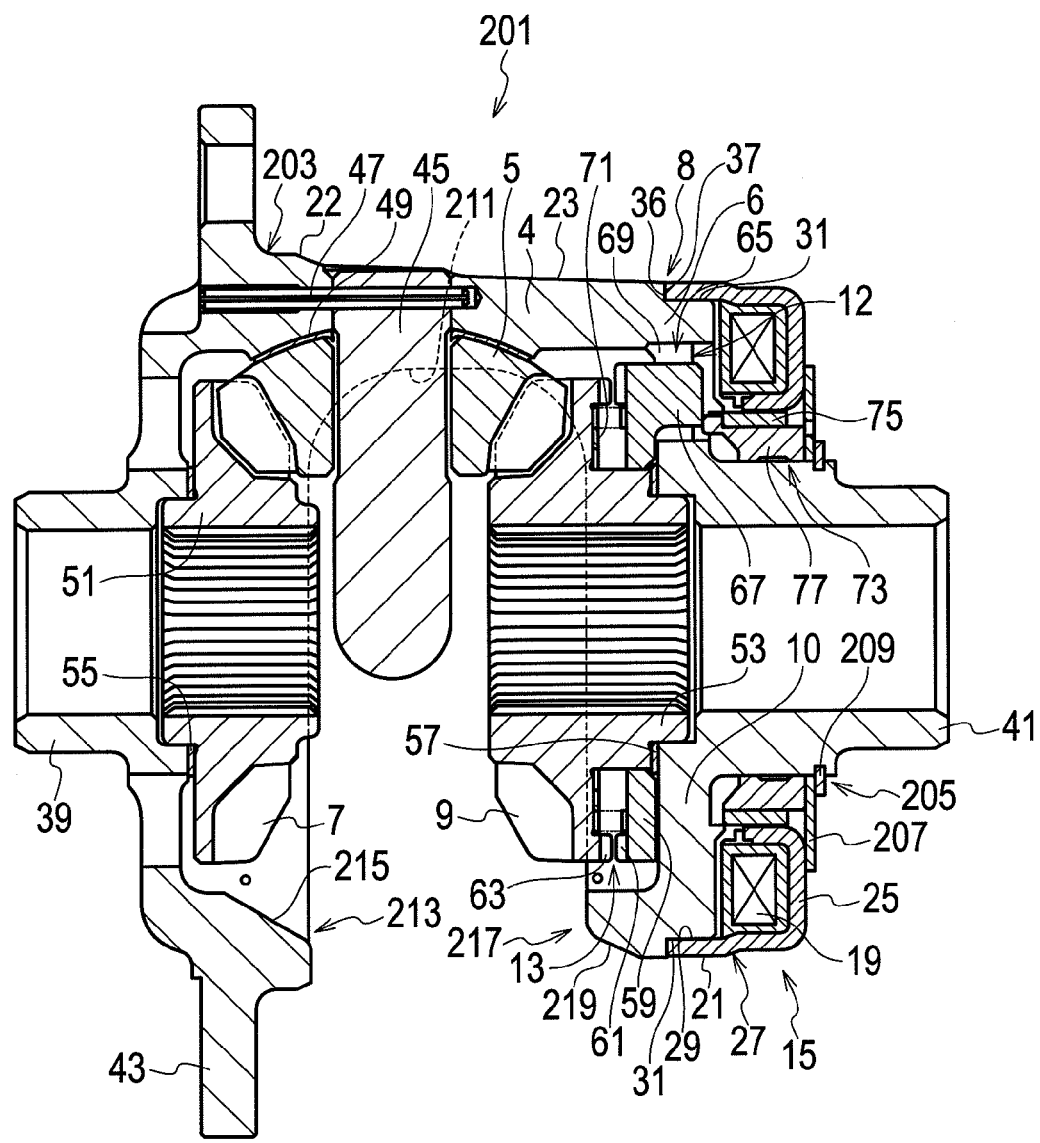
FIG. 4 is a sectional view of a differential device according to a third embodiment of the present invention.

Referring to FIG. 4, a third embodiment of the present invention will be described hereinafter.

A differential device 201 in accordance with the third embodiment has a structure similar to those of the aforementioned differential devices 1 and 101 as the same reference numerals are attached to FIG. 4. The following description will be mainly given to differences from the aforementioned first and second embodiments.

In the differential device 201, a positioning means 205 is provided. The positioning means 205 is comprised of a secured projection 209 projectingly secured with the boss portion of the right boss portion 41, and a contact member 207 engaging with both the positioning member 205 and the right end of the magnetic core 25, thereby positioning the solenoid 15 in the axial direction. The secured projection 209 may be made of any non-magnetic material so as to reduce leakage of magnetism to the case 3.

The aforementioned structure facilitates the installation process because the position of the solenoid 15 is stable prior to installation of the differential device 201 into the driveline system of the automobile. The solenoid 15 integrated with the differential case 3 as a unit can be handled in the installation process.

The differential device 201 may be comprised of a differential case 203 having an opening 211 on the side wall thereof. The opening 211 is to allow access to the interior of the differential case 203 and is further so dimensioned as to allow passage of interior members such as the pinions 5 and the side gears 7,9. The width of the opening 211 in the axial direction is smaller than the diameter of the pinions 5. This prevents the case 203 from losing strength and stiffness. A border 213 of the opening 211 at the inner side has a slanted face 215 slanted inward. As the slanted face 215 facilitates insertion of the pinions 5, the width of the opening 211 can be made smaller as mentioned above. Alternatively, or additionally, a border 217 of the opening 211 at the outer side may have a slanted face 219 slanted outward. The slanted face 219 also facilitates insertion of the pinions 5 and therefore allow relatively small width of the opening 211. This structure allows the differential case 3 to be a one-piece.

Fourth Embodiment

Figure 5:
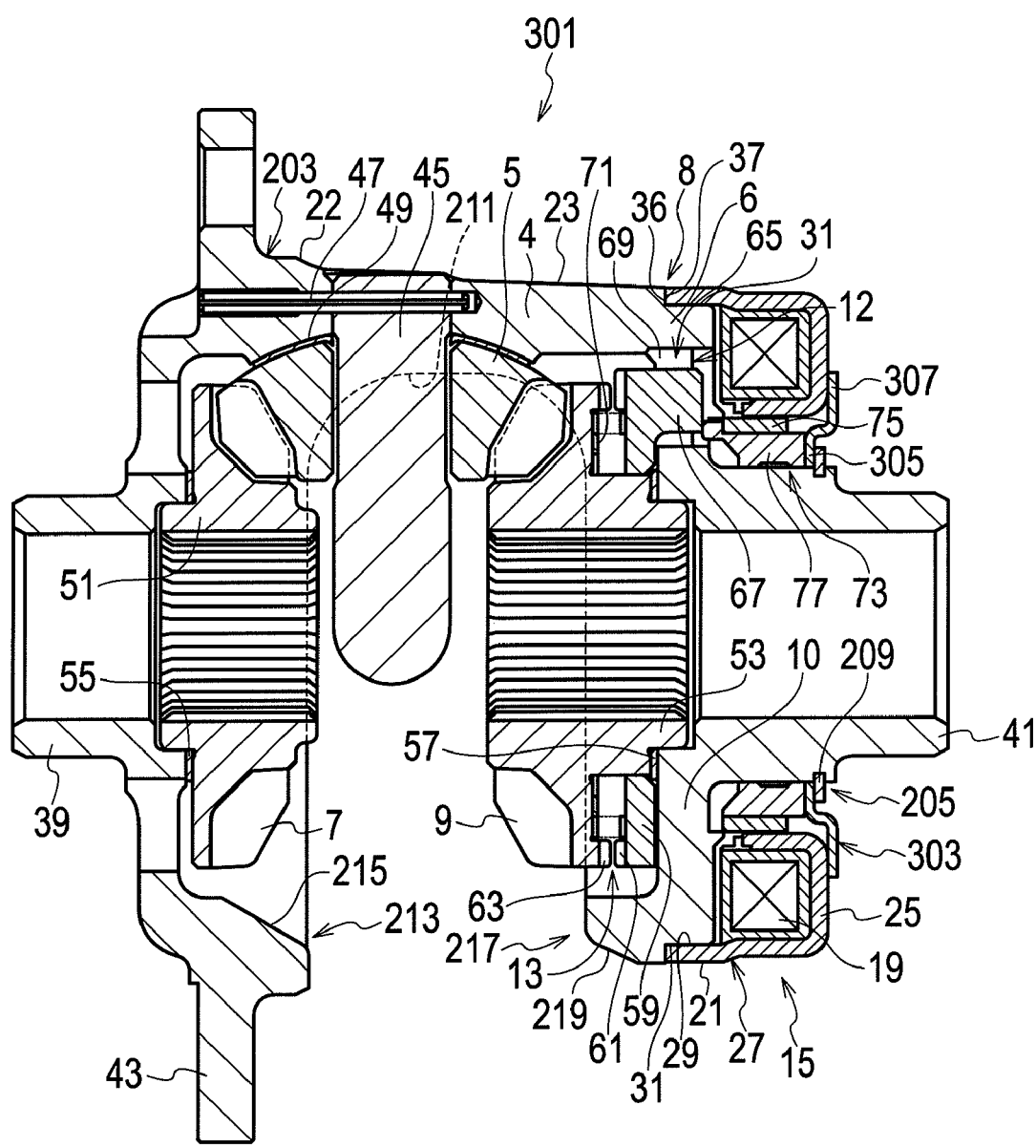
FIG. 5 is a sectional view of a differential device according to a fourth embodiment of the present invention.

Referring to FIG. 5, a fourth embodiment of the present invention will be described hereinafter.

A differential device 301 in accordance with the fourth embodiment has a structure similar to those of the aforementioned differential devices 1, 101 and 201 as the same reference numerals are attached to FIG. 5. The following description will be mainly given to differences from the aforementioned first through third embodiments.

The differential device 301 is also comprised of a positioning means 205, which is comprised of a secured projection 209 and a contact member made up of a base 305 engaging with the secured projection 209 and a contact portion 303 bent rightward. The contact portion 303 can support and position a greater solenoid 15 than that of the third embodiment because it is bent rightward as shown in FIG. 5. As a greater solenoid generates larger magnetic force, the differential device 301 provides improved efficiency in light of the electric power consumption.

Any of the aforementioned embodiments reduces necessity of, or disuses, support by an external stationary member and therefore provides simplicity of the structure.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A differential device for differentially distributing a driving force to first and second axles, the differential device comprising:
   a differential gear set configured to allow differential motion between the first and second axles;
   a casing rotatable about an axis, the casing housing and being drivingly coupled with the differential gear set and including a first end wall, a second end wall axially opposed to the first end wall, and a side wall disposed radially outward, the side wall in combination with the first end wall and the second end wall defining a chamber configured to house the differential gear set;
   a clutch engageable with the differential gear set;
   a solenoid configured to drive the clutch, the solenoid being disposed adjacent to the first end wall; and
   a magnetic core fixed to the solenoid, the core including a sleeve portion snugly and slidably fitting around an outer periphery of the side wall to radially position the core and the solenoid in place, wherein the side wall comprises a shoulder configured to abut on an end of the sleeve portion of the core.

2. The differential device of claim 1, wherein the outer periphery of the side wall of the casing comprises a stepped portion configured to receive the sleeve portion of the core.

3. The differential device of claim 1, wherein one selected from the group consisting of the outer periphery of the side wall of the casing and an inner periphery of the sleeve portion comprises a hardened surface for mutual contact between the side wall of the casing and the sleeve portion.

4. The differential device of claim 1, wherein the sleeve portion is a separate body from the core and fixed to the core.

5. The differential device of claim 1, further comprising:
   an elastic body configured to force the core toward the first end wall.

6. The differential device of claim 1, further comprising:
   a post projecting from the casing so as to position the solenoid in an axial direction relative to the casing.

7. A differential device for differentially distributing a driving force of a power source to first and second axles, the differential device comprising:
   a casing driven by the power source to rotate about an axis, the casing including a first end wall, a second end wall axially opposed to the first end wall, boss portions respectively axially projecting from the first and second end walls, and a side wall disposed radially outward, the side wall in combination with the first end wall and the second end wall defining a housing chamber;
   a differential gear set configured to allow differential motion between the first and second axles, the differential gear set being housed in the housing chamber and drivingly coupled with the casing;
   a clutch configured to lock the differential motion; and
   an actuator including a solenoid to generate a magnetic flux, a plunger axially driven by the magnetic flux to drive the clutch, and a magnetic core configured to conduct the magnetic flux, the magnetic core including a sleeve portion snugly and slidably fitting around an outer periphery of the side wall to radially position the core and the solenoid in place and being not radially borne by any of the boss portions, the core in combination with the first end wall and the plunger forming a closed magnetic circuit.

8. The differential device of claim 7, wherein the outer periphery of the side wall of the casing comprises a stepped portion configured to receive the sleeve portion of the core.

9. The differential device of claim 7, wherein the side wall comprises a shoulder configured to abut on an end of the sleeve portion of the core.

10. The differential device of claim 7, wherein one selected from the group consisting of the outer periphery of the side wall of the casing and an inner periphery of the sleeve portion comprises a hardened surface for mutual contact between the side wall of the casing and the sleeve portion.

11. The differential device of claim 7, wherein the sleeve portion is a separate body from the core and fixed to the core.

12. The differential device of claim 7, further comprising:
   an elastic body configured to force the core toward the first end wall.

13. The differential device of claim 7, further comprising:
   a post projecting from the casing so as to position the solenoid in an axial direction relative to the casing.

* * * * *